June 7, 1938.  G. L. MOORE  2,120,033
PISTON
Filed Nov. 27, 1935  2 Sheets-Sheet 1
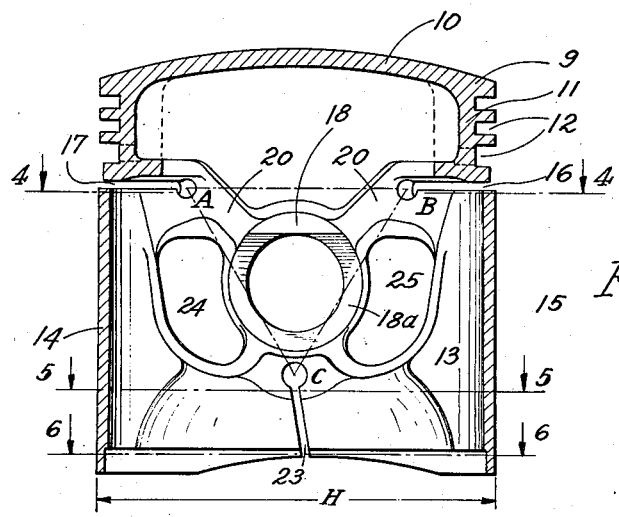
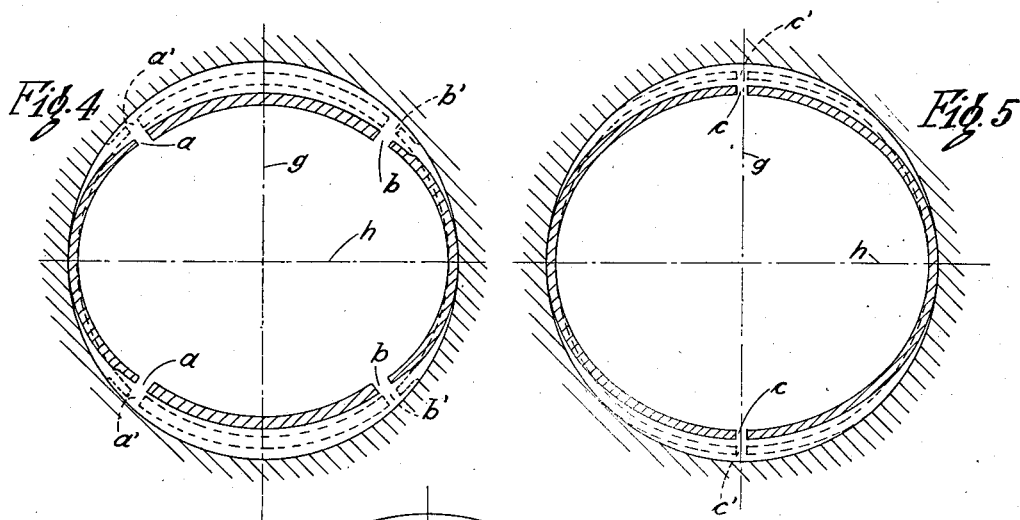
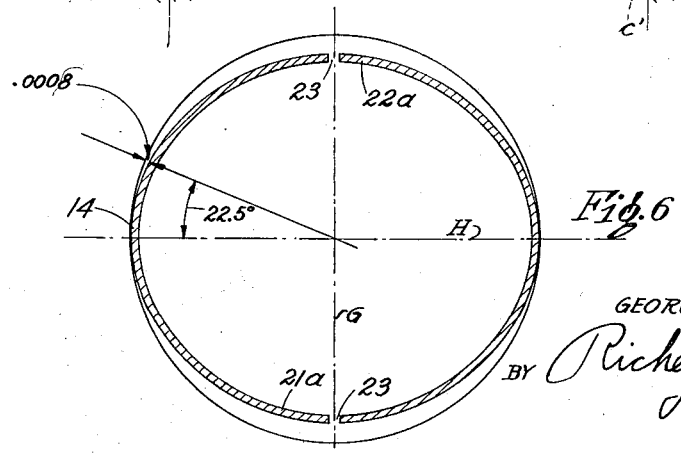
Inventor
GEORGE L. MOORE
BY Richey & Watts
Attorneys June 7, 1938.   G. L. MOORE   2,120,033
PISTON
Filed Nov. 27, 1935   2 Sheets-Sheet 2

Inventor
GEORGE L. MOORE
By Richey & Watts
Attorneys

Patented June 7, 1938

2,120,033

UNITED STATES PATENT OFFICE 2,120,033

PISTON

George L. Moore, Cleveland, Ohio, assignor, by mesne assignments, to The Cleveland Trust Company, Cleveland, Ohio, a corporation of Ohio, as trustee Application November 27, 1935, Serial No. 51,861

3 Claims. (Cl. 309—11)

This invention relates to pistons for internal combustion engines or the like and more particularly pistons made of some metal having a relatively high coefficient of expansion such as aluminum or aluminum alloy or the like to be used in a cylinder made of a material having a relatively low coefficient of expansion such as cast iron or the like.

It is well known that such pistons possess many desirable qualities such as lightness, high heat conductivity, good bearing characteristics and the like but, since the coefficient of expansion due to heat of such materials differs from that of the cylinders in which they operate, difficulties and disadvantages are encountered at various temperatures. For example, pistons that will not slap when cold have a tendency to stick when hot and vice versa.

The principal object of my invention is to provide a piston made of aluminum, aluminum alloy or the like which can be fitted with a very small clearance when installed and which clearance will be substantially maintained throughout the temperature ranges when in operation without slapping, binding, or scoring of the cylinders or undue wear on the piston itself.

The further object of my invention is to provide a light metal piston for combustion engines wherein the thermal expansion of the piston is accommodated along the wrist pin axis and wherein the movement along said wrist pin axis produces a like deformation in each of the thrust faces whereby the vertical axis of the piston coincides with the vertical axis of the cylinder throughout the temperature changes encountered in operation.

A further object of the invention is to provide a piston wherein the thermal expansion tends to increase the diameter of the piston skirt along the wrist pin axis and tends to decrease the diameter of the piston skirt on the thrust face axis and wherein said changes in diameter vary along the vertical height of the thrust face so as to permit the lower portions thereof to assume a proportionate increase in bearing pressure and thereby maintain the unit bearing pressures substantially uniform throughout the height of the skirt. A further object is to provide a piston according to the preceding objects in which the skirt portions beneath the pin bosses are slotted to permit a close fit or oil wiping action by the lower portion of the skirt. These and other objects of my invention as well as the invention itself will be better understood from the description and the drawings forming a part of the specification wherein:

Figure 1 is a transverse sectional view taken through the thrust face axis of a piston embodying my invention;

Figures 4 and 5 are sectional plan views taken through the upper and lower skirt portions on lines 4—4 and 5—5 of Figure 1 with the parts and movements thereof shown on exaggerated scale;

Figure 6 is a sectional view taken on line 6—6 of Figure 1, showing the oval contour greatly exaggerated.

Figure 2:
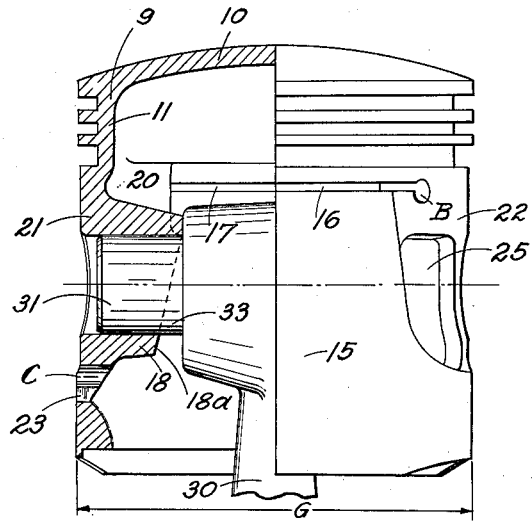
Figure 2 is a side elevation with a part in section taken along the wrist pin axis of the piston.
Figure 3:
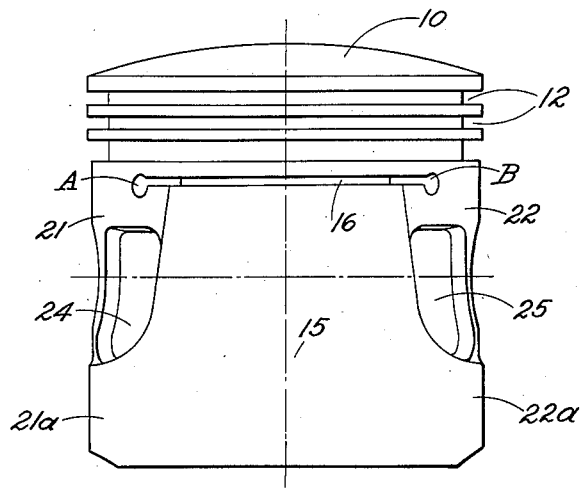
Figure 3 is a side elevation of the piston looking toward a thrust face.

Referring to the drawings the piston illustrated herein embodies a head 9 having a dome-like top wall 10 and a depending cylindrical ring flange 11 grooved as at 12 to receive piston rings. The piston skirt is shown generally at 13 and comprises opposed thrust or wearing faces 14 and 15 and opposed wrist pin boss faces 21 and 22. The thrust faces 14 and 15 are separated from the head 9 at their upper edges by horizontal slots 17 and 16 respectively. The slots 16 and 17 terminate in transverse apertures A and B formed in the pin boss faces 21 and 22 as best illustrated in Figure 3. The upper portion of the pin boss faces and the area surrounding the pin bosses are relieved or set back to remain out of contact with the cylinder wall regardless of the expansion in the piston.

The skirt portion of the piston is provided with integrally formed inwardly extending pin bosses 18 which are preferably cut away or bevelled at their lower side as at 18a. The upper side of the pin boss is suitably proportioned to safely transmit the vertical thrust resulting from the explosion from the head of the piston 10 to the connecting rod 30 by means of the wrist pin 31. Although the lower side of the pin boss is reduced in axial extent by said bevelled face 18a, it is still sufficiently strong to transmit the lesser force of the intake stroke. The reduction in total piston weight effected by the reduction in pin boss mass through the bevelled face 18a is substantial and provides for other advantages such as improved lubrication of the wrist pin.

The oil splash resulting from the connecting rod and crank as the piston reaches its lowermost position in the cylinder covers the wrist pin 31 in that crescent shaped area 33 between the connecting rod and the pin boss with an oil film.

As the piston moves upwardly in the cylinder the wrist pin is turned within the pin boss by the crank eccentricity and a portion of the crescent shaped film of oil is mechanically moved by said turning movement to a position within the pin boss. On the intake stroke of the piston the greatest pin bearing clearance occurs at the upper side of the wrist pin. The inertia effect of that part of the crescent shaped film of oil remaining at the top of the stroke tends to force said oil upwardly into the points of said crescent shaped area and thence laterally through the pin and bearing clearance at the top side of the pin. The oil film acquires an upward momentum on the up stroke and as the piston moves downwardly the bulk of the oil film is forced into the progressively narrowing points of the crescent. The top or unbevelled portion of the pin boss and the connecting rod 30 cooperate to effectively prevent further upward movement of the oil with respect to the piston and the only outlet for said oil is along the upper part of the wrist pin surface where it effectively lubricates the same prior to the next up stroke of the piston.

The ring flange 11 of the piston is machined to a diameter which insures ample clearance with the cylinder walls regardless of the expansion therein during operation, whereas the skirt portion is preferably cam ground as shown in Figure 6, that is, machined to produce a greater diameter (H) across the thrust faces than across the pin boss faces (G). The thrust faces 14 and 15 of the piston are preferably given an oval contour deviating from the circular contour shown by a constantly increasing clearance to provide a maximum clearance at the wrist pin faces. The slight deviation (.0008) from a circular contour at 22½° each side of the thrust face axis prevents any movement of the piston along the wrist pin axis while cold.

Since it is difficult to determine definitely the changes that take place in a piston during operation I will merely advance a theory of operation to support the fact that my piston may be fitted with smaller clearances than heretofore found possible in light metal pistons, and yet will not slap when cold nor seize when heated during operation.

According to my theory of operation the skirt walls of any section through the vertical height of the skirt constitute a flexible normally non-circular band having a lesser perimeter than the cylinder in which it operates and which when subjected to the forces of thermal expansion and pressure existing during operation is shaped by said forces to have a greater perimeter and approach the circular contour of the cylinder within which it operates. In Figure 4 the full sectional outline indicates by means of exaggerated curvature and proportion the position with respect to a circular cylinder of the skirt at about section 4—4 when cold. The axis $g$ represents the pin boss axis and points $a$ and $b$ correspond in diagrammatical showing to the centers of the apertures A and B of Figure 1. $a$ and $b$ may be considered the terminal points of a chord which is normal to the axis G. The expansive forces in the piston head which are transmitted from the head to the skirt through the integral connection adjacent the chord tends to move the segments $a$—$b$ away from each other along the wrist pin axis. The immediate mechanical effect of said movement upon the thrust face sides of the section is to flatten said sides in the same manner as a circular steel band would tend to assume a rectangular shape when parallel chords are moved away from each other. Thus in the absence of thermal expansive forces in the skirt the thrust faces would be moved away from the cylinder walls by the flattening effect. Expansion in the thrust face parts of the skirt, however, compensates in a measure for the flattening tendency of the pull by the chords $a$—$b$, and theoretically at least the combined effect of the operating forces effecting the upper section of the skirt positions the parts as shown in dotted lines in Figure 4.

The effect of head expansion upon the lower portion of the skirt, such as illustrated by the section shown in Figure 5, distinguishes over the effect of this force at the upper portion of the skirt in several respects. In the lower skirt portion there is no chordal sections such as $a$—$b$ to exert the movement along the pin boss axis at spaced points but the said movement may be considered as centered at $c$, a point immediately below the pin boss which is the point of maximum movement due to the pull of head expansion. Theoretically the axial pull may be considered as applied at opposed points $c$—$c$ at each end of the wrist pin axis and reverting to the circular band analogy it will be seen that the most marked deformation will be at the point of force application. In the absence of any other forces acting upon the lower skirt section the mechanical effect of the pull at points $c$—$c$ would be merely to reverse the major and minor axis of the oval section; that is, the axis $g$ would become the major axis and $h$ the minor axis of the oval skirt section. Here as in the upper skirt section the thermal expansion in a measure compensates for the effect of the pull at $c$—$c$ and the combined effect of all the forces acting upon the skirt section tends to position the parts as shown in dotted lines in Figure 5 wherein the lower portion of the skirt effects a close fit rendered resilient by the slots 23 which permits the said lower portion to have an oil wiper action in the cylinder.

While the foregoing discussion of theory has dealt mainly with the expansive forces which increase the perimeter of the piston and the mechanical effects of head expansion upon the shape of the skirt, I appreciate that other forces, such as for instance the impact of the explosion at the head and thrust forces acting on the thrust faces may in a measure effect the operation as outlined. I believe, however, that said other forces are ineffective to substantially destroy or overcome the operative effects which I have outlined.

Referring now to the piston shown in Figure 1 it will be observed that the sole connection between the piston head 11 and the skirt comprises that material above each wrist pin boss between A and B. As the piston head expands in response to the higher temperatures occurring in operation, the head expansion is transmitted to the skirt between A and B in the pin boss face. The thrust faces 14 and 15 being free of the head by reason of slots 16 and 17 tend to be flexed somewhat as shown diagrammatically in Figure 4. The portion of the pin boss face intermediate A and B is relatively massive due to webs 20 and instead of being flexed merely move outwardly along the wrist pin axis. Since the wrist pin boss faces are relieved as heretofore described this outward axial movement is ineffective to cause said faces to bear against the cylinder walls. The operative result of the higher temperature therefore is a tendency to decrease the diameter across the thrust faces. This tendency is compensated for by other agencies including expansion in the skirt so that the ultimate effect is a piston having substantially the same clearances in the cylinder on both thrust faces when heated as when cold.

With reference to the lower portion of the piston thrust faces it will be observed that they are joined to the pin boss adjacent the drilled aperture C which is directly beneath the wrist pin axis. Considering the lower portion of the thrust faces as a continuous flexible ring, the effect of the axial movement of the pin bosses away from each other due to thermal expansion tends to deform the lower part of the piston somewhat as the ring of Figure 5.

Since the upper and lower portions of the thrust faces are not separate rings, however, the deforming influence in the upper portion affects the lower portion and deformation of the lower portion affects the upper. The apparent tendency of the diameter at the upper portion of the thrust faces to be decreased more than the diameter in the lower portion by the same increment of movement along the wrist pin axis is compensated for by the fact that the piston is relatively cooler in the lower portion than in the upper portion and therefore the increments are not actually the same. Thus the diameter across the lower part of the thrust faces is such as will maintain a close bearing fit with the cylinder walls and permits said lower portion to assume a proportionate increase of the increasing bearing pressures attending high speeds.

Thermal expansion in that portion of the skirt beneath the aperture C of the wrist pin boss faces may be accommodated by the slots 23 and by the reduced diameter along the wrist pin axis at this point effected by cam grinding. A close fit maintained in this area of the skirt permits the same to function as an oil wiper and thus dispense with an oil ring thereat.

From the foregoing it will be observed that I have provided a light metal piston having a high coefficient of thermal expansion which may be fitted to the cylinder with small clearances and in which the thermal expansion of the piston head is applied in a different manner at different points throughout the vertical height of the skirt to produce a differential rounding effect therein. Since the thrust faces are unslotted in vertical extent the expansion and deformation of the piston is symmetrical and the axis of the piston coincides with the cylinder throughout the range of temperature changes.

Although I have described one modification of my invention in detail I have done so merely for the purpose of illustration and since variations could be made by those skilled in the art without departing from the scope of my invention I wish to be limited only by what is claimed.

I claim:

1. A light metal piston for internal combustion engines comprising a head and a skirt, said skirt having opposed wrist pin bosses and opposed flexible thrust faces having an oval cross-sectional contour, the upper edges of the thrust faces being separated from the head by spaced circumferential slots, and said skirt being connected to the head above said wrist pin bosses, said thrust faces being connected to said wrist pin bosses below the wrist pin bosses and substantially in a vertical plane passing through the wrist pin axis and separated from each other by substantially vertical slots extending upwardly from the open end of the skirt below the wrist pin bosses, and said skirt being otherwise unslotted.

2. In a light metal piston having a higher coefficient of thermal expansion than the cylinder in which it operates, a head and skirt integrally formed, said skirt having opposed wrist pin boss faces and opposed flexible thrust faces, said thrust faces having an oval cross sectional contour with the major axis thereof normal to the pin boss axis, said boss faces relieved with respect to a circle having a diameter equal to the distance between said thrust faces along said major axis, and each boss face provided with three spaced apertures defining an isosceles triangle, each of said thrust faces separated from said head by a horizontal slot extending between an aperture in one boss face to a corresponding aperture in the other boss face, a substantially vertical slot in each boss face extending up from the open end of the skirt and terminating in the remaining aperture of said face, said skirt being otherwise unslotted, whereby the piston expansion separates the boss faces from each other and causes the thrust faces to flex about lines extending from said last named apertures to the ends of said horizontal slots.

3. In a light metal piston for internal combustion engines, a head and skirt, said skirt having opposed wrist pin boss faces and flexible thrust faces on an axis normal thereto, said thrust faces having an oval cross sectional contour, means to cause said thrust faces to maintain a constant diameter thereacross during the temperature changes occasioned in operation, comprising a relief formed in said boss faces to reduce the diameter thereacross, and a horizontal slot separating each of said thrust faces from the head and terminating in said relief, and a substantially vertical slot extending upwardly from the open end of the skirt beneath each pin boss, said skirt being otherwise unslotted.

GEORGE L. MOORE.